US005917924A

United States Patent [19]
Herbert

[11] Patent Number: 5,917,924
[45] Date of Patent: Jun. 29, 1999

[54] POSTAGE METERING SYSTEM

[75] Inventor: Raymond John Herbert, Essex, United Kingdom

[73] Assignee: Neopost Limited, Essex, United Kingdom

[21] Appl. No.: 08/792,428

[22] Filed: Jan. 30, 1997

[30] Foreign Application Priority Data

Jan. 31, 1996 [GB] United Kingdom ................... 9601946

[51] Int. Cl.[6] .............................. G06K 9/00; G06F 15/20

[52] U.S. Cl. ............................ 382/101; 382/124; 380/23; 235/375; 235/380

[58] Field of Search .................................... 382/124, 101, 382/116; 380/51, 23; 235/375, 383, 492, 380; 283/91

[56] References Cited

U.S. PATENT DOCUMENTS

| | | | |
|---|---|---|---|
| 4,253,086 | 2/1981 | Szwarcbier | 340/146.3 |
| 4,980,542 | 12/1990 | Jackson et al. | 235/375 |
| 4,995,086 | 2/1991 | Lilley et al. | 382/124 |
| 5,142,577 | 8/1992 | Pastor | 380/21 |
| 5,144,680 | 9/1992 | Kobayashi et al. | 382/124 |
| 5,513,272 | 4/1996 | Bagosian, Jr. | 382/116 |
| 5,522,623 | 6/1996 | Soules | 283/91 |
| 5,680,463 | 10/1997 | Windel et al. | 380/51 |

FOREIGN PATENT DOCUMENTS

| | | | |
|---|---|---|---|
| 0 115 876 | 8/1984 | European Pat. Off. | G07B 17/02 |

*Primary Examiner*—Jose L. Couso
*Assistant Examiner*—Matthew C. Bella
*Attorney, Agent, or Firm*—Shoemaker and Mattare, Ltd.

[57] ABSTRACT

A postage meter system including a postage meter is provided with recognition means to recognise a personal characteristic. The recognition means is operated in an initial phase to read a personal characteristic of a person and generates and stores a personal code corresponding to that personal characteristic. In operation of the postage meter the recognition means generates an input code in respect of the personal characteristic of a potential user of the meter and compares the input code with previously stored personal codes. If the input code matches one of the previously stored codes the postage meter is enabled for operation to carry out postage transactions. Information including the personal code may be included in a printed franking impression on mail items which can then be checked by the postal authority.

7 Claims, 1 Drawing Sheet

POSTAGE METERING SYSTEM

BACKGROUND OF THE INVENTION

This invention relates to postage metering systems and postage meters and in particular to such systems and meters in which use of the machine is restricted to authorised users.

Postage meters are utilised to print franking impressions on mail items to indicate that the postage charges for those items have been accounted for. If the postage meter is operated in pre-payment mode, a value of credit is stored in the meter and is decremented by an amount equal to the postage charge as each mail item is franked. If the postage meter is operated in post payment mode payment is made to the postal authority periodically in respect of an accumulated value of franking transactions recorded by the meter. Such postage meters are well known.

It will be appreciated that a postage meter located in premises of a user may be operated without permission of the user for mail other than that being mailed by the user of the postage meter. As a result persons other than the user may frank mail items without cost to themselves and the cost of postage charges for those items will be borne by the user. Previously, use of postage meters has been restricted to authorised personnel by providing the meter with a key operated switch and issuing the corresponding key only to a person authorised to use the postage meter. However the need to use a key is inconvenient and a key operated switch is not satisfactory in preventing unauthorised use of the postage meter if a person authorised to use the postage meter neglects to remove the key from the postage meter after use of the meter thereby enabling anyone to use the meter. It has also been proposed to require a user to key in, on a keyboard of the meter, a personal identification number (PIN) and, if the PIN is recognised by the meter as an authorised PIN, the postage meter then becomes operative to permit use of the postage meter for carrying out franking operations in respect of mail items. Although the use of a PIN to enable the postage meter does not have all of the disadvantages associated with use of key operated switch, knowledge of the PIN may become known to persons other than the authorised person and those other persons are then able to use the postage meter.

SUMMARY OF THE INVENTION

According to the invention a postage meter system includes a postage meter and recognition means to recognise a personal characteristic; said recognition means being operable in an initial phase to read a personal characteristic and to generate and store a personal code corresponding to said personal characteristic and operable in a postage meter operation mode to receive an input code and to compare said input code with stored personal codes and in response to determination of a predetermined relationship between said input code and said stored code to generate an authorisation signal enabling said postage meter to operate to effect transactions.

BRIEF DESCRIPTION OF THE DRAWING

An embodiment of the invention will now be describe by way of example with reference to the drawings in which.

DESCRIPTION OF THE PREFERRED EMBODIMENT

Figure 1:
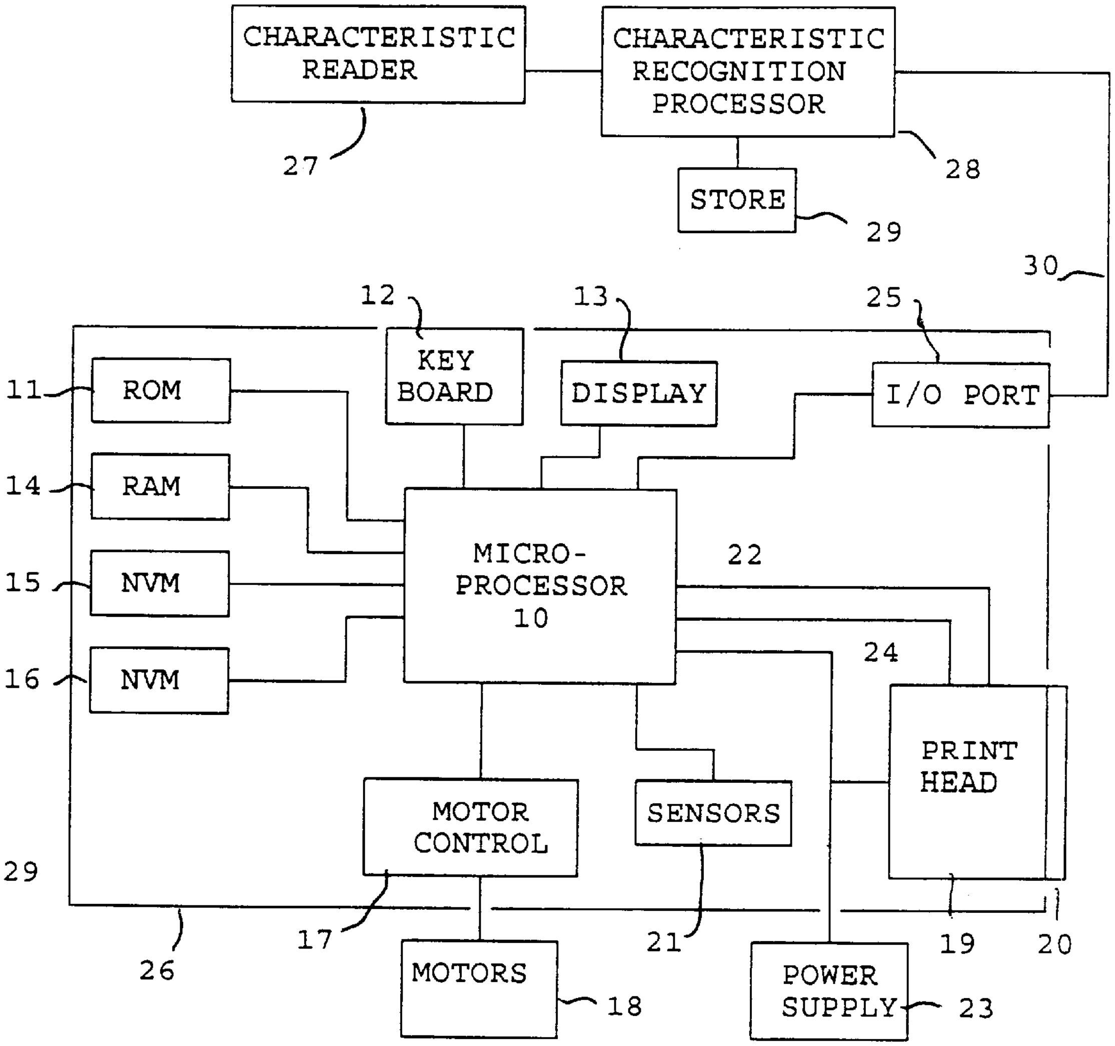
FIG. 1 is a block diagram of a postage meter.
Figure 2:
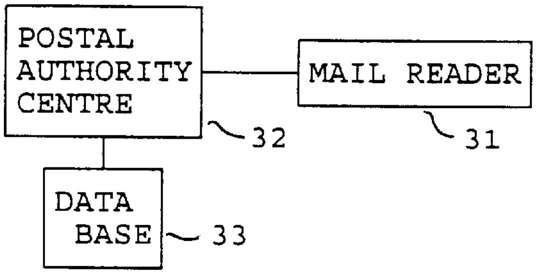
FIG. 2 is a block diagram of postal authority mail handling apparatus.

Referring first to FIG. 1, the postage meter includes electronic accounting and control means comprising a micro-processor 10 operating under program routines stored in a read only memory (ROM) 11. A keyboard 12 is provided for input of commands and data by a user and a display 13 is provided to enable display of information to the user. A random access memory (RAM) 14 is provided for use as a working store for storage of temporary data during operation of the postage meter. Non-volatile duplicated memories 15, 16 are provided for the storage of critical data relating to use of the postage meter and which is required to be retained even when the postage meter is not powered. The micro-processor 10 carries out accounting functions in relation to use of the postage meter for franking mail items with postage charges applicable to handling of the mail items by the postal authority or another carrier. Accounting data relating to use of the postage meter for printing franking impressions representing postage charges for mail items and any other critical data to be retained is stored in the non-volatile memories 15, 16. The accounting data includes a value of credit available for use by the meter in franking mail items, an accumulated total of value used by the meter in franking mail items, a count of the number of mail items franked by the meter and a count of the number of mail items franked with a postage charge in excess of a predetermined value. The value of credit is stored in a descending credit register, the accumulated total value is stored in an ascending tote register, the count of items is stored in an items register and the count of items franked with a postage charge in excess of a predetermined value is stored in a large items register. As is well known in the postage meter art, each of the registers referred to hereinbefore for storing accounting data is replicated in order to enable integrity of the accounting data to be maintained even in the event of a fault or termination of power to the meter during a franking operation. Two replications of each of the registers are provided in each of the memory devices 15, 16.

A motor controller 17 is controlled by the microprocessor 10 to control operation of motors 18 driving feeding means (not shown) for feeding a mail item past a digital print head 19. The digital print head 19 is preferably a thermal print head including selectively energisable thermal printing elements 20. Sensors 21 are provided to sense and monitor feeding of the mail item. The sensors provide signals to the microprocessor to enable the microprocessor to control feeding of the mail item and to selectively energise the thermal print elements 20 of the print head at appropriate times as the mail item is fed past the print head. As the mail item is fed past the thermal printing elements 20 of the print head 19 during a printing operation, the microprocessor outputs on line 22, in each of a series of printing cycles, print data signals selecting those ones of the printing elements 20 which are to be energised in each respective printing cycle. A pulse of electrical power is supplied to the selected thermal printing elements from a power source 23 when a strobe signal is supplied by the microprocessor on a line 24 to the print head.

The thermal printing elements 20 are disposed in a line extending transversely to the direction in which the mail item is fed. Energisation of selected thermal printing elements of the print head in a printing cycle causes heating of areas of the ink layer of the thermal transfer ink ribbon adjacent the energised printing elements. Heating of areas of the ink layer causes those heated areas to adhere more strongly to the mail item than to a substrate backing layer of the ribbon so that when the ribbon is peeled from the mail item after passing the print head, the heated areas remain adhered to the mail item to form printed dots in required locations in a row and the unheated part of the ink layer remains adhered to the backing layer of the ribbon as it is peeled from the mail item. Since the mail item and thermal transfer ink ribbon are fed past the print head during the printing operation, repeated selection and energisation of selected printing elements in the series of printing cycles results in printing of dots in required positions of a corresponding series of columns spaced along the mail item in the direction of feeding of the item. Accordingly a complete printed impression is built up in a column by column manner in the series of printing cycles of a printing operation. It is to be understood that although the postage meter is described hereinbefore as including a thermal printer for printing franking impressions on mail items, the postage meter may include other types of digital printing device such as, for example, impact dot matrix, ink jet and laser.

An input/output port 25 is provided to enable communication between the postage meter and external apparatus. The input/output port 25 may be utilised for communication between the postage meter and a postal authority centre via a communication link such as a telephone network. In addition the input/output port may be utilised for communication between the postage meter and other external devices, for example weighscales, for the input of postage or other data to the postage meter and for the output of data from the postage meter.

It will be appreciated that, as is well known in the postage meter art, the postage meter must operate in a secure manner and be protected from attempts to use the meter fraudulently for example by utilising the postage meter to print franking impressions on mail items for which no corresponding postage charge has been accounted for by the accounting means. Accordingly those parts of the postage meter required to be secured against unauthorised tampering are housed in a secure housing 26.

In so-called prepayment operation of a postage meter, the descending register of the meter is set with a value of credit which is then available for use in franking mail items and, as each mail item is franked with a postage charges, the value in the descending register is decremented by the amount of the postage charge. Each time a franking operation is to be performed, the microprocessor carries out a routine in which a determination is made as to whether the value of credit in the descending register is sufficient to cover the cost of the postage charge intended to be applied in respect of the mail item. If the value in the descending register is sufficient the franking operation is continued and the values in the registers are updated to account for the postage charge and the franking impression is printed. However if the value of credit in the descending register is less than the postage charge intended to be applied to the mail item, the routine is terminated and the franking impression is not printed. Generally, if the microprocessor determines that the value of credit in the descending register is less than a predetermined value, the microprocessor terminates the current franking operation and locks the postage meter from further use in franking mail items until such time as the value of credit in the descending register has been reset to a higher value.

Resetting of the descending register with a new updated value of credit and reading of the registers may be effected by the user taking the postage meter to a postal authority resetting office or it may be effected remotely by use of communication via the input/output port 25 and a telephone communication link with a remote resetting centre at a postal authority centre.

It is desirable to provide means whereby use of the postage meter in carrying out franking of mail items and in carrying out recredit transactions to reset credit in the postage meter is restricted to persons authorised by the user to use the postage meter and reset the credit respectively. The same persons may be authorised both to use the postage meter and to carry out recredit transactions or if desired some persons may be authorised to use the postage meter to carry out franking of mail items while only a senior person or manager is authorised to carry out recredit transactions.

It is proposed that enabling of the postage meter to carry out transactions be effected in response to the meter recognising or identifying a characteristic of the person or persons authorised to use the postage meter.

A preferred manner of enabling the postage meter to be used by authorised persons to carry out transactions is by recognition of a finger print, or portion of a finger print, of those persons. Systems for finger print recognition are becoming available at a cost which is acceptable in relation to electronic office equipment such as personal computers and postage meters.

A characteristic reader 27 is connected to a characteristic recognition processor 28. The reader is responsive to a characteristic of a person and input data characteristic data to the processor 28. Preferably the characteristic is the finger print or portion of a finger of a person. In one system for recognition of finger prints which could be used for the present purpose the reader forms two images of the finger print pattern are formed and are offset in relation to one another. This offset of the images creates Moire fringe patterns and these patterns are analysed by the processor 28. The images may be repeatedly offset in different directions to produce a plurality of Moire fringe patterns. The processor generates a personal code based on the patterns analysed. It will be appreciated that finger print patterns are unique to a person and accordingly the personal code generated by the processor is unique to a person whose finger print pattern has been read by the reader 27. A memory 29 is connected to the processor 28 and a database of finger print patterns is stored in the memory.

Initially when a person is to be authorised to use the postage meter, the finger print pattern of that person is read by the reader 27 and the code generated as a result is stored in the database in memory 29. Subsequently when that person wishes to use the postage meter, the finger print pattern of the person is again read by the reader 27 and analysed by the processor as was effected previously. The processor then compares the code generated currently with the codes stored in the database of memory 29. If a match is found an authorisation signal authorising use of the postage meter is generated by the processor 28. The processor is connected to the postage meter via a connection 30 to the I/O port 25. The microprocessor of the postage meter is programmed to be inoperative normally to perform transactions for franking mail items or for recredit of the meter. In response to the receipt of the authorisation signal, the microprocessor is enabled to operate the postage meter in transactions for franking mail and for recredit of the postage meter.

The authorisation signal preferably is in the form of a code and may be encrypted to prevent the postage meter being enabled by a false signal. The authorisation signal preferably includes the unique personal code generated as a result of reading and analysing the finger print pattern. The microprocessor 10 when generating print data to control the print head 19 to print a franking impression may include the unique personal code in the data to be printed in the franking impression. The unique personal code may be printed in plain text form, in encrypted form and may be printed as bar code or the like machine readable code. The personal code may be combined with any other code desired to be included in the printed franking impression.

If the postage meter is arranged to operate to include the unique personal code in the printed franking impression, the postal authority may carry out checks on mail received at a postal depot. A mail reader 31 is connected to a mail data processor 32 and scans the franking impression on each mail item to determine the unique personal code contained therein. The personal code read from the mail items is compared by the mail data processor 32 with personal codes stored in a database 33 maintained by the postal authority to establish whether the personal code is one which has been notified to the postal authority as being a code associated with a person authorised to use the postage meter for franking transactions. If the personal code is determined to be an authorised code the mail item is accepted otherwise the mail item is rejected and reference is made to the user of the postage meter before further processing of the mail item.

If desired the characteristic recognition processor may be placed in communication with the mail data processor 32 to update the database 33 with new personal codes generated by the recognition processor 28.

The characteristic recognition processor may be implemented by a personal computer or may be apparatus designed specifically for the purpose of characteristic recognition.

If desired the unique personal code generated as result of reading a person's finger print pattern may be stored in a smart card. Then instead of recognition of a person's finger print pattern when it is desired subsequently to use the postage meter, a smart card reader may be provided and the unique personal code is read from the smart card. This would enable a more simple reading device to be used after initial reading of the finger print pattern.

If the postage meter is provided with means to maintain account records for a plurality of departments, the personal code may be utilised to assign postage charges to an account with which that personal code is associated.

I claim:

1. A postage meter system including postage metering means and recognition means operative to recognise a personal characteristic of a user of the postage metering means;

said recognition means including:

reading means to sense a personal characteristic of a user of said postage meter and to generate a first personal code corresponding to said sensed personal characteristic;

storage means to store a second personal code corresponding to a personal characteristic of an authorized user of said postage metering means;

means operable to compare said first personal code and said second personal code and operative in response to determination of a predetermined relationship between said first personal code and said second personal code to generate an authorization signal and to send said authorization signal and one of the personal codes to the postage metering means;

said postage metering means including:

accounting and control means;

printing means operable by said accounting and control means;

said accounting and control means normally being operable to carry out a postage dispensing operation only in response to receipt of said authorization signal; and said accounting and control means being operable in the postage dispensing operation in response to receipt of the authorization signal to carry out accounting transactions in respect of said postage dispensing operation and responsive to the personal code received from said recognition means to generate printing data in respect of the postage dispensing operation and the personal code received from said recognition means to operate said printing means to print a frankling impression including the personal code received from said recognition means.

2. A postage meter system as claimed in claim 1, wherein the reading means of the recognition means is operable in an initialization mode to sense a personal characteristic of a user and to generate the second personal code corresponding to said sensed personal characteristic and to write said second personal code to the storage means for subsequent use in recognition of said user.

3. A postage meter system as claimed in claim 1 wherein the personal code sent by the recognition means to the postage metering system is included in the authorization signal.

4. A postage meter system as claimed in claim 1 wherein the storage means stores a plurality of second personal codes and the comparison means is operative to compare the first personal code with the stored plurality of second personal codes to determine if there is the predetermined relationship between the first personal code and one of said second personal codes.

5. A postage meter system as claimed in claim 1, and including mail checking means; said mail checking means including a mail reader operable to read franking impressions on mail items; a database of personal codes of authorized users of the postage metering means; and means to compare a personal code read from a franking impression on a mail item with the personal codes in said database.

6. A postage meter system as claimed in claim 5 wherein the mail checking means is located at a postal authority mail handling location.

7. A postage meter system as claimed in claim 1 wherein the personal characteristic is a finger print pattern.

* * * * *